United States Patent
Becher et al.

(10) Patent No.: US 10,112,520 B2
(45) Date of Patent: Oct. 30, 2018

(54) TEMPERATURE MEASURING DEVICE AND TRANSPORT VEHICLE SKIP

(71) Applicant: MOBA Mobile Automation AG, Limburg (DE)

(72) Inventors: Dominik Becher, Limburg (DE); Marcus Watermann, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 379 days.

(21) Appl. No.: 14/918,999

(22) Filed: Oct. 21, 2015

(65) Prior Publication Data

US 2016/0123819 A1     May 5, 2016

(30) Foreign Application Priority Data

Oct. 23, 2014   (DE) ...................... 10 2014 221 560

(51) Int. Cl.
| | |
|---|---|
| *G01K 13/10* | (2006.01) |
| *B60P 3/00* | (2006.01) |
| *G01K 1/08* | (2006.01) |
| *G01K 1/14* | (2006.01) |
| *G01K 1/16* | (2006.01) |

(Continued)

(52) U.S. Cl.
CPC ............... *B60P 3/00* (2013.01); *B60P 1/283* (2013.01); *B60P 1/286* (2013.01); *E01C 19/08* (2013.01); *G01K 1/143* (2013.01); *G01K 13/10* (2013.01)

(58) Field of Classification Search
CPC ............ G01K 1/14; G01K 1/08; G01K 13/02; G01K 1/12; G01K 1/16; G01K 2201/02; G01K 2215/00; G01K 13/08; G01K 13/10; B60P 3/10

USPC ................ 73/141, 208, 163, 100, 153
See application file for complete search history.

(56) References Cited

U.S. PATENT DOCUMENTS 2,374,397 A  *  4/1945  Wagner ................ B28C 7/0053
                                                       298/8 R
2,848,008 A  *  8/1958  Dietert ..................... B22C 5/08
                                                       137/392

(Continued)

FOREIGN PATENT DOCUMENTS

| AT | 399 777 B | 7/1995 | |
| CN | 103180230 A * | 6/2013 | ............. B65G 43/00 |

(Continued)

OTHER PUBLICATIONS

Official Communication issued in corresponding European Patent Application No. 15 19 0665.8, dated Apr. 12, 2016.

(Continued)

*Primary Examiner* — Gail Kaplan Verbitsky
(74) *Attorney, Agent, or Firm* — Keating & Bennett, LLP

(57) ABSTRACT

A temperature measuring device includes a temperature sensor, arranged within a holder, for determining the temperature of a building material located within a skip of a transport vehicle, the skip including an inner wall and an outer wall, and the holder being arranged on that side of the inner skip wall that faces the outer skip wall. The holder is arranged within a recess within the inner skip wall such that it is thermally insulated from the inner skip wall. The holder is arranged within the recess such that a region, which faces the interior of the skip, of the holder is exposed.

18 Claims, 6 Drawing Sheets

(51) Int. Cl.
  *B60P 1/28*   (2006.01)
  *E01C 19/08*  (2006.01)

(56) References Cited

U.S. PATENT DOCUMENTS

| | | | | |
|---|---|---|---|---|
| 3,535,931 | A | * | 10/1970 | Gruett .................... G01F 23/02 374/E1.018 |
| 4,324,945 | A | * | 4/1982 | Sivyer ..................... G01K 1/08 136/230 |
| 5,064,295 | A | * | 11/1991 | Thill ....................... G01K 1/14 374/139 |
| 5,660,098 | A | * | 8/1997 | Van Den Berghe .... A23P 30/36 99/323.4 |
| 5,667,305 | A | * | 9/1997 | Walker ..................... G01K 1/14 374/148 |
| 6,602,322 | B2 | * | 8/2003 | McClelland, Jr. ........ C22B 5/16 266/100 |
| 2012/0288328 | A1 | * | 11/2012 | Minich .................. E01C 23/07 404/72 |
| 2013/0146672 | A1 | * | 6/2013 | DePaso ................. B65G 43/00 236/91 D |
| 2016/0052169 | A1 | * | 2/2016 | Baumrind ............. B28C 5/1818 366/7 |

FOREIGN PATENT DOCUMENTS

| | | | |
|---|---|---|---|
| CN | 203657924 U | 6/2014 | |
| DE | 92 05 442 U1 | 7/1992 | |
| DE | 20 2014 009 511 U1 | 3/2015 | |
| EP | 1156312 A1 * | 11/2001 | ............... G06K 1/14 |
| JP | 56-011329 A | 2/1981 | |
| JP | 60-156428 U | 10/1985 | |
| JP | 61-243333 A | 10/1986 | |
| JP | 05138332 A * | 6/1993 | |
| JP | 08-101076 A | 4/1996 | |
| JP | 2000-144625 A | 5/2000 | |
| JP | 2003-247896 A | 9/2003 | |
| JP | 2006-51887 A | 2/2006 | |
| JP | 2010-107477 A | 5/2010 | |
| WO | WO 2012034029 A1 * | 3/2012 | ............. B65G 43/00 |

OTHER PUBLICATIONS

Official Communication issued in corresponding Japanese Patent Application No. 2015-206395, dated Nov. 2, 2016.

Official Communication issued in corresponding Japanese Patent Application No. 2015-206395, dated Mar. 20, 2018.

* cited by examiner

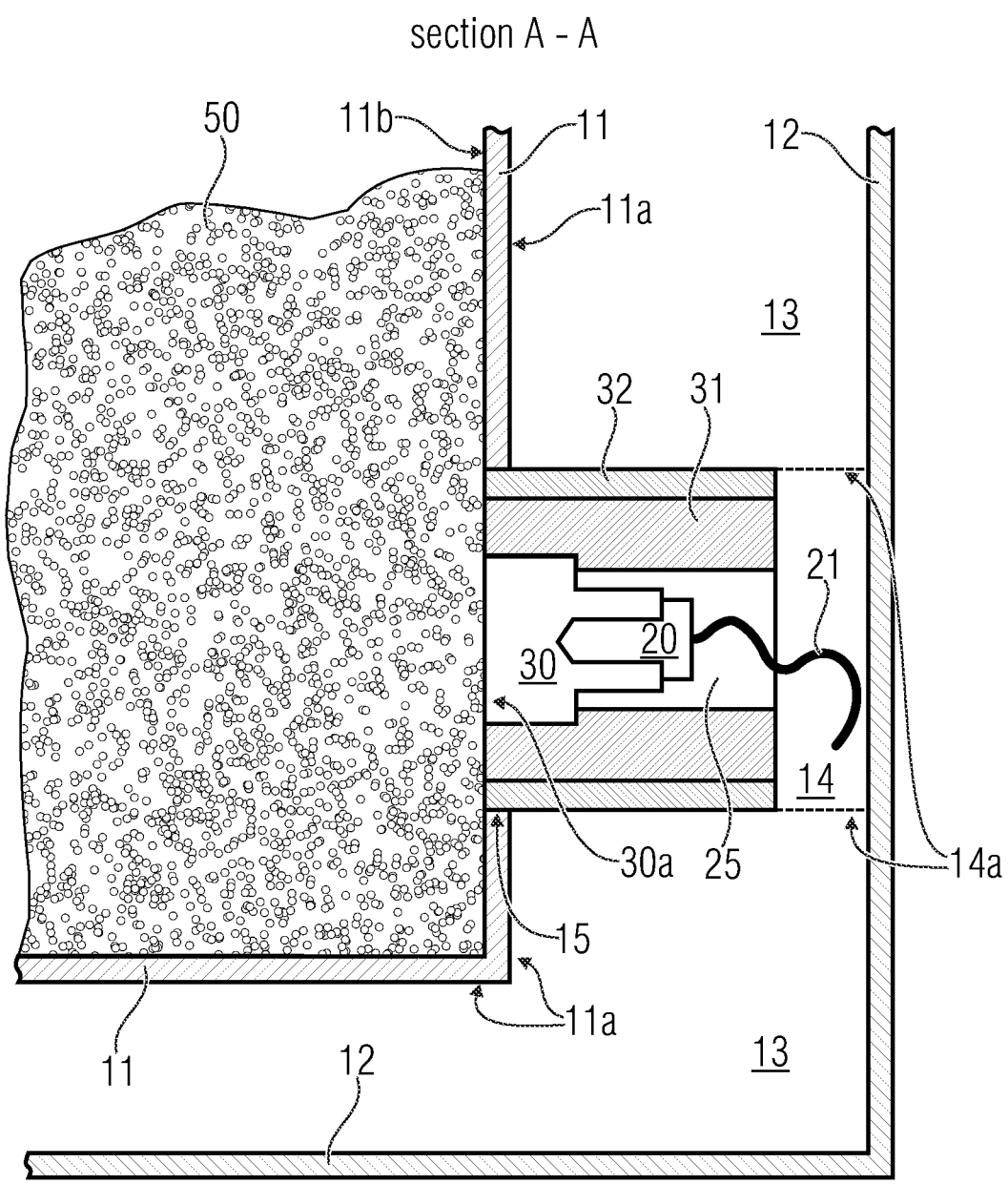

TEMPERATURE MEASURING DEVICE AND TRANSPORT VEHICLE SKIP

CROSS-REFERENCE TO RELATED APPLICATIONS

This application claims priority from German Patent Application No. 10 2014 221 560.9, which was filed on Oct. 23, 2014, and is incorporated herein in its entirety by reference.

The present invention relates to the field of transport vehicle skips (vehicle bodies), in particular, the invention relates to a temperature measuring device comprising a temperature sensor arranged within a holder for determining the temperature of a building material located within a skip of a transport vehicle, in particular of road building material such as asphalt, bitumen, mixed asphalt materials, or the like, the skip comprising an inner wall and an outer wall, and the holder being arranged on that side of inner skip wall that faces the outer skip wall.

In addition, the invention relates to a transport vehicle skip for transporting building material, in particular road building material such as asphalt, bitumen, mixed asphalt materials, or the like.

BACKGROUND OF THE INVENTION

When transporting hot road building materials such as hot asphalt or mixed asphalt materials, for example, from the mixer to the installation site, the material located within the skip of a transport vehicle typically cools off. With long transport routes or long hold-up times of the transport vehicle at the installation site, this results in that the material has already cooled off too much by the time it is loaded off and/or transferred to a road finishing machine or a feeder, which results in reduced quality of the road surface provided.

In order to minimize such instances of the material cooling off along the transport route, specific thermo-insulated transport skips are mandatory, as of the year 2015, in transport vehicles for hot road building materials such as hot asphalt or mixed asphalt materials, for example. Similarly, a temperature measuring device is mandatory which is mounted on the transport vehicle and which continuously picks up and logs measurement values by means of several temperature sensors mounted on the side walls as well as on the floor of the transport skip.

A thermally insulated transport skip consists of an inner and an outer wall and interposed insulating material. As is depicted in FIG. 2, for fastening a temperature sensor it is known to weld a holder 30 to that side 11a of the inner skip wall 11 which faces the outer wall 12, said holder 30 having the temperature sensor 20 screwed into it, for example. Thus, the temperature sensor 20 detects, via the holder 30, the temperature of the building material 50 abutting on the inner skip wall 11. Between the inner skip wall 11 and the outer skip wall 12, there is mainly insulating material 13, a cavity 14, i.e. a region without any insulating material 13, being located in the region between the holder 30 and/or the temperature sensor 20 and the outer skip wall 12, schematically depicted by the demarcation lines 14a.

What is disadvantageous about this arrangement is that a large amount of heat is dissipated across the large surface area of the inner skip wall, i.e. the skip wall has the effect of a dissipator. By load-bearing elements such as steel or aluminum girders, for example, which are arranged in the skip wall, i.e. between the inner and outer walls, for reasons of stability, the heat dissipation through the skip wall is reinforced even more. Since the temperature measuring means is in direct thermal contact with the inner skip wall, the heat dissipation influences temperature measurement, which consequently results in considerable deviations in measured values during temperature measurement. Also, due to the large surface area of the inner skip wall, there is a very slow rise in temperature at the temperature sensor, so that a stable measurement value will not be obtained until a certain amount of time has elapsed.

Moreover, the large surface area of the skip wall presents a point of entry for environmental influences such as rain, wind, or sun, for example, which influence the heat dissipation through the skip wall and consequently the measurements of the temperature sensor. The open and unprotected region, i.e. the cavity between the holder and/or the temperature sensor and the outer skip wall, also has a negative effect on the measurements of the temperature sensor. Since measurements performed during transport of building material within the skip have shown that instances of the outer skip wall heating up and/or cooling off due to the environmental influences mentioned are reflected by the measurement values of the temperature sensor.

Moreover, test measurements performed at various skip setups have shown that both the different materials such as aluminum or steel, for example, from which the skip wall is manufactured, and the thermal transfer resistances resulting therefrom, and the different types of skips such as tipping skips or box skips, for example, lead to considerable differences in the temperature values measured.

In addition, it is disadvantageous that in the course of repair work performed on the skip, for example due to wear and tear occurring on the inner skip wall, individual steel or aluminum plates are welded on in a planar manner. Such "doubling" gives rise to air gaps forming between the newly welded-on plate and the original skip wall, whereby thermal insulation arises in the region of the temperature sensor. Consequently, this also results in considerable deviations in the measured values.

SUMMARY

According to an embodiment, a temperature measuring device may have: a temperature sensor, arranged within a holder, for determining the temperature of a building material located within a skip of a transport vehicle, the skip including an inner wall and an outer wall, and the holder being arranged on that side of the inner skip wall that faces the outer skip wall, wherein the holder is arranged within a recess within the inner skip wall such that it is thermally insulated from the inner skip wall, and the holder is arranged within the recess such that a region, which faces the interior of the skip, of the holder is exposed.

According to another embodiment, a transport vehicle skip for transporting building material may have a temperature measuring device, and the temperature measuring device may have: a temperature sensor, arranged within a holder, for determining the temperature of a building material located within a skip of a transport vehicle, the skip including an inner wall and an outer wall, and the holder bring arranged on that side of the inner skip wall that faces the outer skip wall, wherein the holder is arranged within a recess within the inner skip wall such that it is thermally insulated from the inner skip wall, and the holder is arranged within the recess such that a region, which faces the interior of the skip of the holder is exposed.

In accordance with embodiments, a temperature measuring device is provided which includes a temperature sensor, arranged within a holder, for determining the temperature of a building material located within a skip of a transport vehicle, the skip comprising an inner wall and an outer wall, and the holder being arranged on that side of the inner skip wall that faces the outer skip wall, the holder being arranged within a recess within the inner skip wall such that it is thermally insulated from the inner skip wall, and the holder being arranged within the recess such that a region, which faces the interior of the skip, of the holder is exposed.

In accordance with embodiments, the holder is arranged within the recess such that the exposed region of the holder is in direct thermal contact with the building material when the skip is filled.

In accordance with embodiments, the holder comprises a cladding which is arranged between the inner skip wall and the holder and which thermally insulates the holder and the temperature sensor from the inner skip wall.

In accordance with embodiments, the cladding corresponds with the holder.

In accordance with embodiments, the holder is arranged essentially flush with the inner surface of the inner skip wall.

In accordance with embodiments, the above object is achieved by a temperature measuring device wherein the holder comprises a corresponding cladding which thermally insulates the holder and the temperature sensor from the inner skip wall, and in that the inner skip wall comprises a recess through which the holder and the cladding protrude, so that the holder is in direct thermal contact with the building material.

Advantageously, the inventive temperature measuring device is no longer in direct thermal contact with the skip wall, so that the influence of the skip wall, i.e. its heat dissipation, does not influence temperature measurement. Accordingly, the response of the temperature sensor will also improve, i.e. a rise in temperature on the temperature sensor now occurs considerably faster after the skip has been filled, so that a stable measurement value will be obtained after a short amount of time already.

What is also advantageous in the above is that the inventive temperature measuring device is independent of the design of the skip, i.e. is independent, on the one hand, of the material from which the skip wall is manufactured, and is independent, on the other hand, of the different types of skips such as tipping skips or box skips, for example, since the measuring device is thermally decoupled from the skip wall.

Moreover, environmental influences such as rain, wind, or sun, for example, which influence heat dissipation through the skip wall, advantageously have no more or only very little effect on the measurements performed by the temperature sensor on account of the insulated design of the inventive temperature measuring device.

According to embodiments, the holder comprises a corresponding cladding which is U-shaped in its cross section and which thermally insulates the holder and the temperature sensor from the inner skip wall and the outer skip wall. Moreover, the inner skip wall comprises a recess through which the holder and the cladding protrude, so that the holder is in direct thermal contact with the building material. Advantageously, the inventive temperature measuring device, i.e. in particular the temperature sensor, thus is no longer influenced by environmental effects such as rain, wind, or sunshine, for example, that act on the outer skip wall. Accordingly, instances of the outer skip wall heating up and/or cooling off, as are caused by the environmental influences mentioned, are not reflected anymore, or are hardly reflected anymore, by the temperature value measured.

According to the invention, the cladding comprises, on the side which faces the outer skip wall, a closure by means of which the cladding for fastening the temperature sensor can be opened.

According to the invention, the device comprises, on the side facing the outer skip wall, a cable bushing through which a connecting cable for electrically connecting the temperature sensor is routed.

According to the invention, the closure comprises an external thread and the cladding comprises an internal thread in the region of the surface that is in contact with the closure, and that the closure and the cladding are screwed together in the assembled state.

According to the invention, the temperature sensor is cast, in the region of the electrical connection, by means of a casting compound having a thermally and electrically insulating effect. To this end, a casting compound having a high temperature resistance, such as a casting compound based on silicone rubber, is advantageously used.

According to the invention, a further, advantageously sleeve-like assembly cladding which consists of aluminum, steel or the like and corresponds to the cladding of the holder and of the temperature sensor, is arranged around the cladding of the holder for fastening the temperature measuring device to the inner skip wall, the assembly cladding being open in the direction towards the outer skip wall. What is advantageous about this is that as a result, the temperature measuring device may be fastened to the inner skip wall in a simple manner and at low cost.

According to the invention, the cladding of the holder comprises an external thread, and the assembly cladding comprises an internal thread, and both claddings are screwed together in the assembled state. In an advantageous manner, during manufacturing of the skip, the assembly cladding may initially be fastened to the inner skip wall. The remaining components of the temperature measuring device can then be easily screwed into the assembly cladding and adjusted accordingly in a later process step.

What is advantageous about this is, in addition, that in the event of repair work being done on the skip, for example due to wear and tear, which involves welding on of individual steel or aluminum plates in a planar manner, there will be no thermal insulation and, consequently, no deviations of measured values because of the possibilities of adjusting, or the adjustment, of the remaining components of the temperature measuring device, i.e. of the holder with the temperature sensor arranged therein.

According to the invention, the device is fastened to the skip, in particular to that side of the inner skip wall which faces the outer skip wall, by means of the assembly cladding, advantageously it is welded thereon, screwed thereon, adhered thereto, riveted thereto, or the like.

According to the invention, the surface area across which the building material is in thermal contact with the holder comprises a circular, rectangular, or square shape.

According to the invention, the holder consists of metal, advantageously aluminum, an aluminum alloy, steel or the like. Advantageously, a material having very low thermal transfer resistance is selected here.

According to the invention, the corresponding cladding of the holder consists of plastic, for example of PTFE or the like.

According to the invention, the temperature sensor is screwed, glued, pressed, or clamped into the holder.

The present invention also provides a transport vehicle skip for transporting building material, in particular road building material such as asphalt, bitumen, mixed asphalt materials or the like, which comprises the inventive temperature measuring device.

BRIEF DESCRIPTION OF THE DRAWINGS

Embodiments of the present invention will be detailed subsequently referring to the appended drawings, in which:

FIG. 3 shows a sectional representation of the skip shown in FIG. 1 with an inventive temperature measuring device;

DETAILED DESCRIPTION OF THE INVENTION

Figure 1:
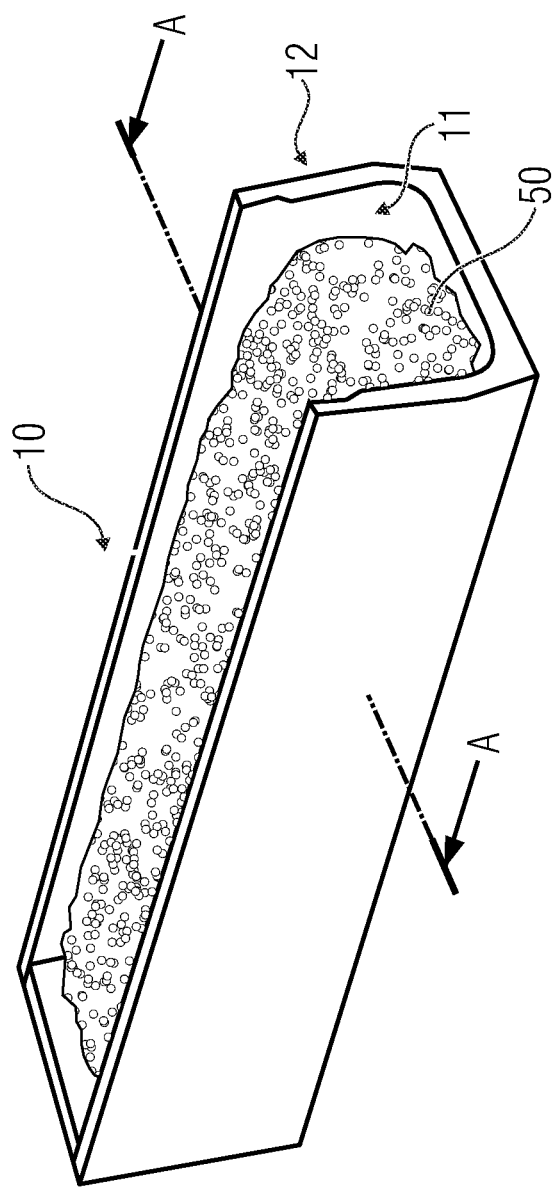
FIG. 1 shows a schematic representation of a skip of a transport vehicle filled with building material.

In the following description of the embodiments, elements that are identical or have identical actions will be provided with identical reference numerals in the accompanying figures. The following explanation is based on a skip of a transport vehicle, advantageously for transporting road building material, however it shall be noted that the inventive principle is applicable to any implementations of transport skips such as so-called dumpers (skip trucks) or the like, for example, as well as to skips or containers for transporting other materials.

FIG. 1 schematically shows a skip 10, filled with building material 50, of a transport vehicle. The skip 10, for example a thermally insulated skip, here consists essentially of an inner wall 11 and an outer wall 12, the skip 10 being open at its rear end so as to be able to unload the building material 50. In a thermally insulated skip 10, insulating material 13 and, for reasons of stability, load-bearing elements such as steel or aluminum girders, for example, (not shown here) are located between the inner skip wall 11 and the outer skip wall 12.

Figure 2:
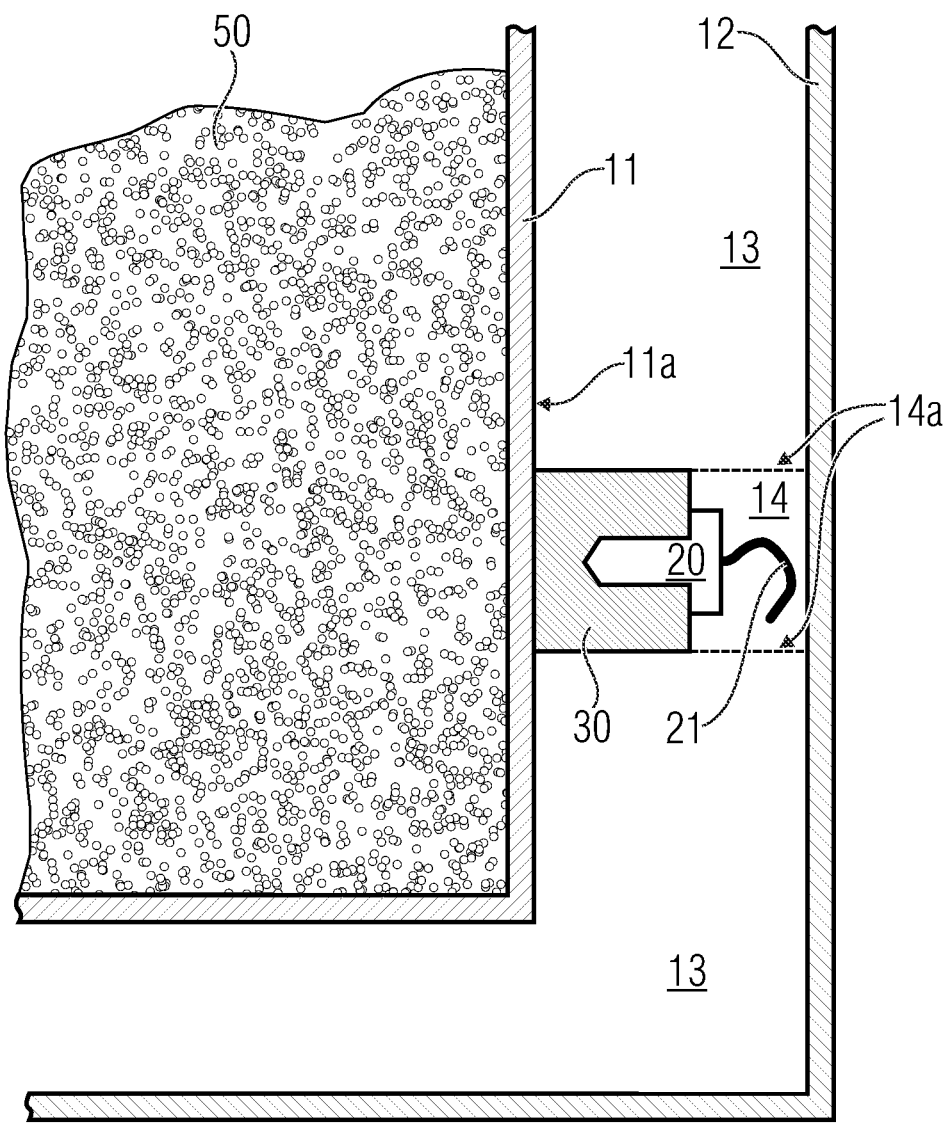
FIG. 2 shows a sectional representation of the skip shown in FIG. 1 with a temperature measuring device known from conventional technology.

FIG. 2 shows the skip 10, shown in FIG. 1 in a sectional representation along the line A-A with a temperature measuring device known from conventional technology. The temperature measuring device here consists of a holder 30 which is arranged on the outer side 11a, i.e. on a side 11a of the inner skip wall 11 that faces the outer wall 12, and which has a temperature sensor 20 screwed into it, for example. The inner skip wall 11 and the outer skip wall 12 mainly have insulating material 13 located between them, a cavity 14, i.e. a region without any insulating material 13, being located in the region between the holder 30, or the temperature sensor 20, and the outer skip wall 12, schematically represented by the demarcation lines 14a. The holder 30 typically consists of aluminum, an aluminum alloy or steel or the like and is welded, for example, to the outside 11a of the inner skip wall 11. Via the holder 30, the temperature sensor 20 detects the temperature of the building material 50 abutting on the inner skip wall 11 since the building material 50 is thermally connected to the temperature sensor 20 via the inner skip wall 11 and the holder 30. The temperature values measured may be read out or processed further via a connecting cable 21 arranged at the temperature sensor 20.

FIG. 3 shows the skip 10, represented in FIG. 1, in a sectional representation along the line A-A; however, unlike FIG. 2, in this case with a first embodiment of the inventive temperature measuring device. The temperature measuring device here consists of a holder 30 consisting of a material having a low thermal transfer resistance such as aluminum, an aluminum alloy or steel, or the like, for example. In the direction toward the building material 50, the holder 30 comprises a contact surface 30a which has a circular, rectangular, or square shape and via which the building material 50 is in thermal contact with the holder 30.

In addition, the holder 30 comprises a cladding 31 which consists of plastic and corresponds to it, i.e. is adapted to the outer shape of the holder 30, and which thermally insulates the holder 30 from the inner skip wall 11. Here, the cladding 31 is open in the direction of the outer skip wall 12 and toward the building material 50. A further sleeve-like assembly cladding 32 which advantageously consists of aluminum or steel and corresponds to the cladding 31 and is intended for fastening the temperature measuring device to the inner skip wall 11 is arranged around the cladding 31. The cladding 31 may comprise an external thread, and the assembly cladding 32 may comprise an internal thread (not shown here), so that the two claddings 31 and 32 are screwed to each other in the assembled state. Moreover, the inner skip wall 11 comprises a recess 15 through which the holder 30 and the claddings 31 and 32 protrude, so that the holder 30 as well as the claddings 31 and 32 are in direct contact with the building material 50 present within the skip 10.

The holder 30 has a temperature sensor 20 screwed into it, for example, which measures the temperature of the building material 50 since the building material 50 is thermally connected to the temperature sensor 20 across the surface 30a and the holder 30. The temperature values measured may be read out and/or processed further via a connecting cable 21 arranged at the temperature sensor 20. In order to protect the electric connection 21 at the temperature sensor 20 from humidity that may enter, for example, the connection area of the temperature sensor 20 is cast by means of a temperature-resistant and insulating casting compound 25 such as a casting compound based on silicone rubber, for example.

By analogy with FIG. 2, the inner skip wall 11 and the outer skip wall 12 also have insulating material 13 located between them, a cavity 14, i.e. a region without any insulating material 13, being located in the region between the inventive temperature measuring device and the outer skip wall 12, schematically shown by the demarcation lines 14a.

Figure 4A:
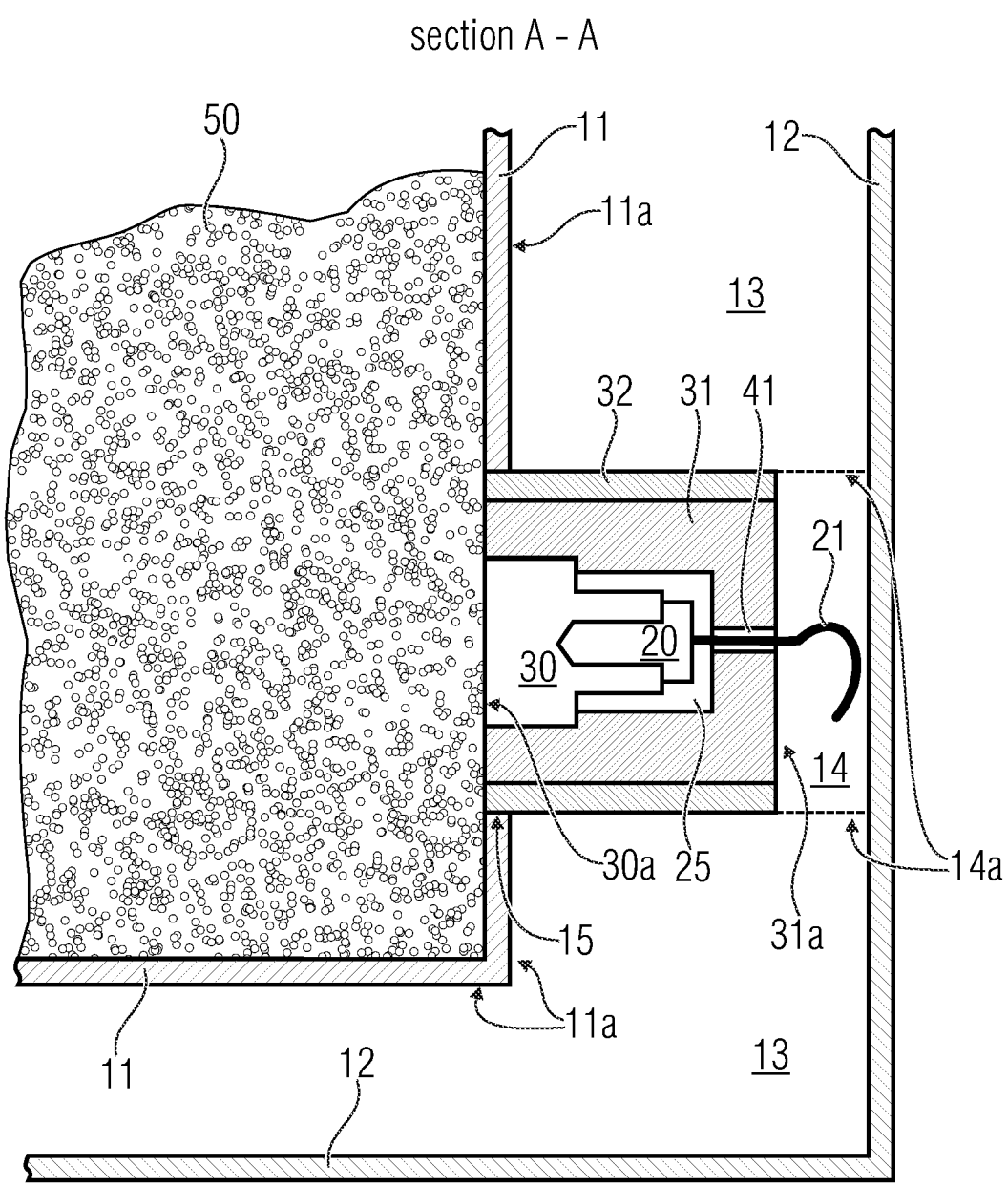
FIG. 4a shows an inventive temperature measuring device as is shown in FIG. 3, comprising a modified cladding of the holder.

FIG. 4a shows an inventive temperature measuring device as shown in FIG. 3 in a second implementation. The cladding 31 here is open only in the direction toward the building material 50, the cladding 31 is essentially closed in the direction of the inner skip wall 11 and the outer skip wall 12, so that it thermally insulates the holder 30 and the temperature sensor 20 both from the inner skip wall 11 and the outer skip wall 12. To this end, the cladding 31 has a U-shape in its cross section. On the side 31a which faces the outer skip wall 12, the cladding 31 comprises a cable bushing 41 through which a connecting cable 21 for electrically connecting the temperature sensor 12 is routed.

Figure 4B:
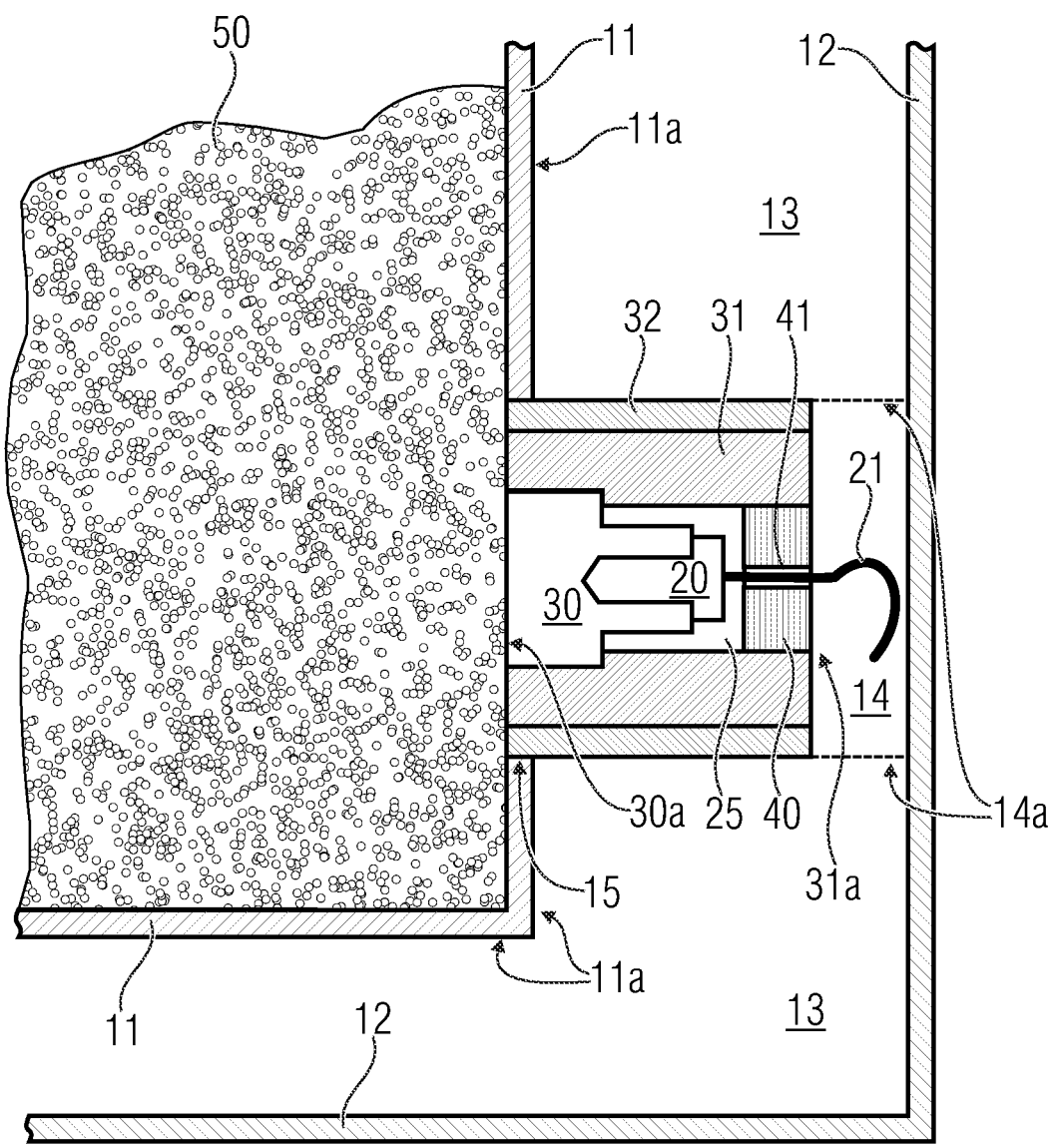
FIG. 4b shows an inventive temperature measuring device as is shown in FIG. 4a which comprises a cladding of the holder that has been modified in the direction of the outer wall.

FIG. 4b shows an inventive temperature measuring device as shown in FIG. 4a, comprising a cladding 31 modified in the direction of the outer skip wall 12. The cladding 31 is also open only in the direction toward the building material 50, the cladding 31 is essentially closed in the direction of the inner skip wall 11 and the outer skip wall 12, so that it thermally insulates the holder 30 and the temperature sensor 20 both from the inner skip wall 11 and the outer skip wall 12. Unlike in FIG. 4a, the cladding 31 comprises, on the side 31a which faces the outer skip wall 12, a closure 40 by means of which the cladding 31 for fastening the temperature sensor 20 can be opened. For example, the closure 40 may also comprise an external thread, and the cladding 31 may comprise an internal thread in the region of the surface that is in contact with the closure 40, so that the closure 40 and the cladding 31 may be screwed together in the assembled state.

Moreover, the closure comprises, on the side 31a that faces the outer skip wall 12, a cable bushing 41 through which a connecting cable 21 for electrically connecting the temperature sensor 20 is routed.

In all of the representations of the temperature measuring device it is to be noted that same may be arranged both in the side walls, the front or rear walls as well as in the floor of the skip 10.

Figure 5:
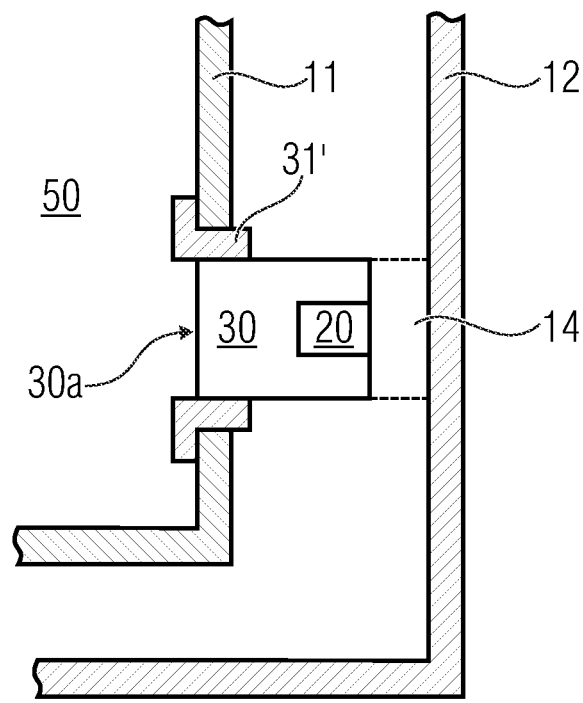
FIG. 5 shows an embodiment wherein the holder is configured by an insulating ring.

The embodiments described above describe a temperature measuring device comprising a cladding which corresponds to the holder, i.e. comprising a cladding which is adapted to the outer shape of the holder and thermally insulates the holder from the inner skip wall. The present invention is not limited to such configurations. Instead of the above-described claddings, other insulating components may also be provided which are arranged between the holder and the inner skip wall. FIG. 5 shows an alternative embodiment wherein the holder 30 is configured by an insulating ring 31', so that at least those portions of the holder 30 that are in contact with the inner skip wall 11 are insulated from the inner skip wall 11. The insulating ring 31' may be configured such that is arranged only within the recess. Alternatively, the ring 31' as is shown in FIG. 5 may protrude beyond the recess and in the direction of the interior of the skip and/or the exterior of the skip. In accordance with further embodiments, the ring 31' may be configured such that it extends from the inner surface of the recess to that side 11a (outer wall) of the inner skip wall 11 which faces the outer wall 12, and/or to the inner wall 11b of the inner skip wall 11 (see FIG. 5).

The above-described embodiments describe a temperature measuring device, the holder of which is arranged essentially flush with the inner surface 11b of the inner skip wall 11. Preferably, the exposed region 30a of the holder 30 is flush with the inside 11b of the inner skip wall 11. The flush arrangement of the holder 30 is advantageous since it avoids that asphalt material rests get caught, when they are unloaded, on the protruding holder or in that region in which the holder is set back. Such remaining or adhering material rests may result in a restriction of the sensitivity of the sensor and, thus, to less accurate or slower temperature detection. If the holder protrudes into the interior of the skip, increased wear and tear may also occur in the region of the exposed surface, which is reduced by a flush arrangement. In addition, in skips which push off the material to be unloaded (the skip is not tipped), a sensor device sticking out inwardly is disadvantageous since the slider used is configured flush with the inner skip wall in such skips.

Figure 6A:
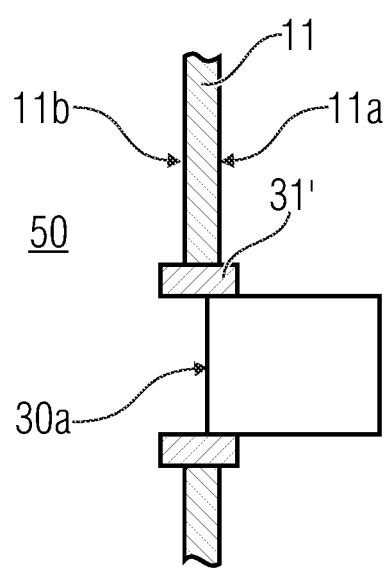
FIG. 6 shows embodiments wherein the holder within the recess is arranged such that it is set back in relation to the inner skip wall (FIG. 6(a)) or protrudes into the interior (FIG. 6(b)).
Figure 6B:
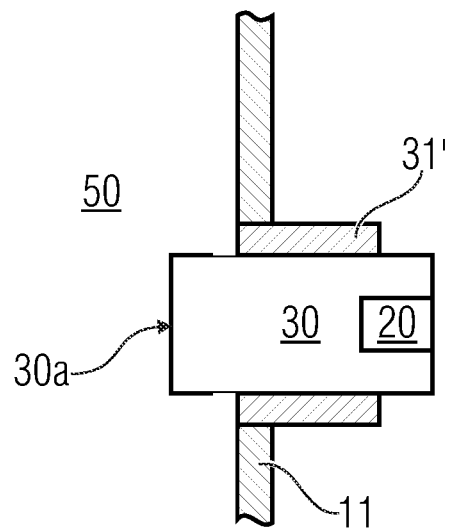

The present invention is not limited to implementations wherein the holder is arranged flush with the inner surface 11b of the inner skip wall 11. In principle, the holder may also be arranged differently, for example when it is ensured that any remaining material is removed from the holder and/or when the skip has no slider for unloading. FIG. 6 shows alternative implementations wherein the holder 30 is set back within the recess in relation to the inner skip wall 11 (see FIG. 6(a)) or protrudes into the interior (see FIG. 6(b)).

In accordance with a further embodiment, the temperature measuring device is arranged in an adjustable manner, so that a position of the holder 30, or of the exposed region 30a of the holder 30, may be adjusted in relation to the inside 11b of the inner skip wall 11. This enables maintaining the flush arrangement, for example, by readjusting accordingly, even when the inner skip wall at the assembly position of the sensor is subject to spot-repairing, e.g. by fastening (e.g. welding) a metal plate to the site. In this case, the flush arrangement with the spot-repaired inner wall may be ensured by readjusting the position accordingly. The adjustment may be performed by using the above-described threads.

The above-described embodiments describe a temperature measuring device, the holder of which is arranged at a distance from the outer skip wall. The present invention is not limited to such implementations; rather, the holder and/or the cladding may be configured to adjoin the outer wall, so that the above-mentioned cavity 14 is filled.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF REFERENCE NUMERALS 10 skip
11 inner skip wall
11a outer surface (outer wall) of the inner skip wall
11b inner surface (inner wall) of the inner skip wall
12 outer skip wall
13 insulating material
14 cavity
14a cavity demarcations
15 recess
20 temperature sensor
21 connecting cable
25 casting compound
30 holder
30a contact surface
31, 31' cladding of the holder
31a rear side of the cladding
32 assembly cladding
40 closure of the cladding
41 cable bushing
50 building material

The invention claimed is:
1. A temperature measuring device comprising:
a temperature sensor, arranged within a holder, for determining the temperature of a building material located within a skip of a transport vehicle, the skip comprising an inner wall and an outer wall, and the holder being arranged on that side of the inner skip wall that faces the outer skip wall, wherein the holder is arranged within a recess within the inner skip wall such that it is thermally insulated from the inner skip wall, and the holder is arranged within the recess such that a region, which faces the interior of the skip, of the holder is exposed.

2. The temperature measuring device as claimed in claim 1, wherein the holder is arranged within the recess such that the exposed region of the holder is in direct thermal contact with the building material when the skip is filled.

3. The temperature measuring device as claimed in claim 1, wherein the holder comprises a cladding which is arranged between the inner skip wall and the holder and which thermally insulates the holder and the temperature sensor from the inner skip wall.

4. The temperature measuring device as claimed in claim 3, wherein the cladding corresponds with the holder.

5. The temperature measuring device as claimed in claim 1, wherein the holder is arranged essentially flush with the inner surface of the inner skip wall.

6. The temperature measuring device as claimed in claim 3, wherein the cladding is U-shaped in its cross section.

7. The temperature measuring device as claimed in claim 6, wherein the cladding comprises, on the side which faces the outer skip wall, a closure by means of which the cladding for fastening the temperature sensor can be opened.

8. The temperature measuring device as claimed in claim 7, wherein the closure comprises an external thread and the cladding comprises an internal thread in the region of the surface that is in contact with the closure, and that the closure and the cladding are screwed together in the assembled state.

9. The temperature measuring device as claimed in claim 1, wherein the device comprises, on the side facing the outer skip wall, a cable bushing through which a connecting cable for an electrical connection of the temperature sensor is routed.

10. The temperature measuring device as claimed in claim 1, wherein the temperature sensor is cast, in the region of the electrical connection, by means of a casting compound which exhibits a thermally and electrically insulating effect.

11. The temperature measuring device as claimed in claim 3, wherein an assembly cladding is arranged around the cladding of the holder for fastening the temperature measuring device to the inner skip wall, the assembly cladding being open toward the outer skip wall.

12. The temperature measuring device as claimed in claim 11, wherein the cladding of the holder comprises an external thread and the assembly cladding comprises an internal thread, and that the two claddings are screwed together in the assembled state.

13. The temperature measuring device as claimed in claim 11, wherein the device is fastened to the skip by means of the assembly cladding.

14. The temperature measuring device as claimed in claim 1, wherein the exposed region of the holder comprises a circular, rectangular, or square shape.

15. The temperature measuring device as claimed in claim 1, wherein the holder comprises aluminum, an aluminum alloy, or steel.

16. The temperature measuring device as claimed in claim 3, wherein the cladding of the holder comprises plastic.

17. The temperature measuring device as claimed in claim 1, wherein the temperature sensor is screwed, glued, pressed, or clamped into the holder.

18. A transport vehicle skip for transporting building material, comprising a temperature measuring device as claimed in claim 1.

* * * * *